United States Patent
Changle et al.

[11] Patent Number: 5,875,885
[45] Date of Patent: Mar. 2, 1999

[54] COMBINED WIRE LEAD AND INTERPHASE BARRIER FOR POWER SWITCHES

[75] Inventors: Joseph F. Changle, Carnegie; Kenneth N. Skoug, Pittsburgh, both of Pa.

[73] Assignee: Eaton Corporation, Cleveland, Ohio

[21] Appl. No.: 864,100

[22] Filed: May 28, 1997

[51] Int. Cl.⁶ ............................................ H01H 9/02
[52] U.S. Cl. .................................. 200/293; 200/304
[58] Field of Search .............................. 200/293, 304; 439/501, 445; 218/156, 157

[56] References Cited

U.S. PATENT DOCUMENTS

| | | |
|---|---|---|
| 4,375,021 | 2/1983 | Pardini et al. . |
| 4,484,045 | 11/1984 | Seymour et al. . |
| 4,485,283 | 11/1984 | Hurtle . |
| 4,492,836 | 1/1985 | Pardini et al. . |
| 4,568,907 | 2/1986 | Hurtle ........................................ 338/61 |
| 4,589,052 | 5/1986 | Dougherty ................................ 361/94 |
| 4,591,942 | 5/1986 | Willard et al. ............................. 361/97 |
| 4,598,187 | 7/1986 | Howell . |
| 4,679,019 | 7/1987 | Todaro et al. ........................... 335/172 |
| 4,700,161 | 10/1987 | Todaro et al. ........................... 335/172 |
| 4,728,914 | 3/1988 | Morris et al. ............................... 335/6 |
| 4,742,321 | 5/1988 | Nagy et al. ............................... 335/20 |
| 4,754,247 | 6/1988 | Raymont et al. ........................ 335/202 |
| 4,757,294 | 7/1988 | Todaro et al. ........................... 335/202 |
| 4,774,390 | 9/1988 | Lehman et al. .......................... 200/304 |
| 4,786,885 | 11/1988 | Morris et al. ............................ 335/202 |
| 4,788,621 | 11/1988 | Russell et al. ........................... 361/115 |
| 4,789,848 | 12/1988 | Castonguay et al. .................... 335/167 |
| 4,794,356 | 12/1988 | Yu et al. ................................... 335/13 |
| 4,806,893 | 2/1989 | Castonguay et al. ..................... 335/20 |
| 4,831,221 | 5/1989 | Yu et al. ................................... 200/553 |
| 4,860,162 | 8/1989 | DeVissi ................................... 361/376 |
| 4,860,184 | 8/1989 | Russell ...................................... 361/87 |
| 4,894,631 | 1/1990 | Castonguay et al. .................... 335/167 |
| 4,912,439 | 3/1990 | Nagy et al. .............................. 335/132 |
| 4,950,852 | 8/1990 | Goldman et al. . |
| 4,963,849 | 10/1990 | Kowalczyk et al. .................... 335/201 |
| 4,970,481 | 11/1990 | Arnold et al. ............................... 335/6 |
| 4,970,482 | 11/1990 | Jacobs et al. ............................ 335/201 |
| 4,982,173 | 1/1991 | Meiners et al. ........................... 355/21 |
| 5,005,880 | 4/1991 | Raine et al. ............................... 292/17 |
| 5,075,658 | 12/1991 | Lesslie et al. ............................. 335/14 |
| 5,107,236 | 4/1992 | Lesslie .................................... 335/132 |
| 5,150,091 | 9/1992 | Hart et al. ........................... 200/293 X |
| 5,605,224 | 2/1997 | Seymour et al. ........................ 200/401 |

*Primary Examiner*—Renee S. Luebke
*Attorney, Agent, or Firm*—Martin J. Moran

[57] ABSTRACT

Insulative guide members secured to an end face of switching apparatus between power terminals route electrical leads from attachment devices mounted inside the molded housing of the switch which exit the housing above the power terminals down between the power terminals toward the rear face thereby providing physical separation and electrical isolation between these leads and the power terminals and conductors connected to them. The insulative guide members are secured to the molded housing by a tongue-and-groove connection. The insulative guide members also form interface barriers with increased, oversurface distance between adjacent power terminals and conductors which can be further increased by longitudinal ribs on the guide members. In another configuration, the guide members can be secured to the confronting end faces of adjacent switching apparatus to provide interface isolation and to route leads from auxiliary switches from adjacent a front face of the switches toward a rear face.

16 Claims, 3 Drawing Sheets

COMBINED WIRE LEAD AND INTERPHASE BARRIER FOR POWER SWITCHES

CROSS REFERENCE TO RELATED APPLICATIONS

The subject matter for this invention is related to concurrently filed co-pending applications; U.S. patent application Ser. No. 08/864,104, (96-PDC-547) entitled "Circuit Interrupter With Covered Accessory Case, Adjustable Under Voltage Relay, Self-Retaining Collar and One-Piece Rail Attachment"; U.S. patent application Ser. No. 08/864,095; (96-PDC-110) entitled "Circuit Interrupter With Plasma Arc Acceleration Chamber and Contact Arm Housing"; and U.S. patent application Ser. No. 08/864,141, (95-PDC-369) entitled "Circuit Breaker With Welded Contact Inter-lock, Gas Sealing Cam Rider and Double Rate Spring".

BACKGROUND OF THE INVENTION

1. Field of the Invention

This invention relates to power switching devices having attachments with electrical leads which are routed externally of the molded housing enclosing the switching device. More particularly, it relates to an insulative wire lead which guides the attachment wiring between power terminals and simultaneously provides an insulative barrier which increases the oversurface distance between phases of multiphase switching devices.

2. Background Information

Low voltage power switches such as, for instance, circuit breakers, contactors and overload relays, typically have a switching unit mounted in an insulative molded housing. Commonly, multiphase load terminals are mounted side-by-side in recesses in one end of the molding housing, while line terminals are similarly mounted side-by-side in recesses in the opposite end. In many installations, attachments providing electrical outputs from or inputs to the switching device are provided within the molded housing. Examples of these attachments are bell alarms providing an indication of a tripped condition and a shunt trip device by which a circuit breaker can be tripped remotely.

Typically, the switching device is mounted on a panel and the attachment wiring is routed to the panel. In many cases, the attachment wiring exits a side of the housing. In other cases, the attachment wiring exits the back face of the switch housing. It is common in these cases to bundle the attachment wires with wire ties. In at least one instance, side exiting attachment wires are routed through a channel molded into the housing base.

In some installations, spacing between adjacent molded housings does not permit side exit of the attachment wires. Also, attachments are being offered as options or add-ons mountable in compartments in the cover of the switching device which is not compatible with rear exit of the wiring. This leaves the end faces of the molded housing where the power terminals are located. However, the attachment wiring must be physically separated and electrically isolated from these terminals and the connected conductors.

There is a need therefore for an improved wire lead for attachment wiring for power switching devices.

There is a particular need for such a wire lead for guiding attachment wiring exiting the end faces of power switches which spaces the wiring from the power terminals and connected conductors.

There is a further need for such a wire lead which is simple, inexpensive and easy to use and install.

SUMMARY OF THE INVENTION

These needs and others are satisfied by the invention which is directed to switching apparatus for an electric power circuit having an attachment device connected in the switch housing with electrical leads exiting the switch housing adjacent power terminals spaced apart and at an end face of the switch housing. An insulative guide member having an elongated body with a longitudinally extending passage through which the electrical leads are routed is secured to the end face adjacent to the power terminals. Thus, the electrical leads are routed near the power terminals but are electrically insulated and physically separated therefrom by the insulative guide member. Typically, the power terminals are mounted in terminal recesses extending generally from a front face to a rear face of the switch housing. The electrical leads exit the switch housing at an exit point spaced from the rear face of the switch housing and the elongated body of the insulative guide member extends along the end face of the switch housing adjacent to terminal recesses substantially from the exit point to the rear face. The elongated body of the insulative guide member extends between adjacent terminal recesses and extends laterally outward from the end face of the switch housing so that, in addition to providing an insulative routing channel for the attachment leads, it also provides an oversurface distance between adjacent terminal recesses greater than the spacing between the terminal recesses over the end face to reduce the potential for flash over.

Preferably, the elongated body of the insulative guide member is secured to the end face of the switch housing by a tongue-and-groove connection. Preferably, the tongue is on the elongated body and the groove is in the end face. In a particularly advantageous embodiment of the invention, the switch housing has a base, a primary cover mating with the base and a secondary cover on the primary cover. In this case, the tongue extending longitudinally on the elongated body engages aligned grooves in the primary cover and the base. The groove in the base has a first cross section, and the groove in the primary cover has a second cross section, including a dimension greater than a corresponding dimension of the first cross section, thereby forming a shoulder. The tongue on the elongated body has a first portion with a cross section complimentary to the first cross section of the groove in the base and a second portion with a cross section complimentary to the second cross section in the primary cover such that with a first portion of the tongue engaging the groove in the base and the second portion of the tongue engaging the groove in the primary cover, the second portion of the tongue is captured longitudinally between the shoulder and the secondary cover.

As another aspect of the invention, the elongated bodies of several insulative barriers can be used to electrically isolate conductors extending between two switching units and secured to the end faces of the two switching units between the confronting terminals by tongue-in-groove connections. These insulative barriers can also have longitudinal passages for routing electrical leads for attachment needs.

BRIEF DESCRIPTION OF THE DRAWINGS

A full understanding of the invention can be gained from the following description of the preferred embodiments when read in conjunction with the accompanying draw,hags in which.

DESCRIPTION OF THE PREFERRED EMBODIMENT

Figure 1:
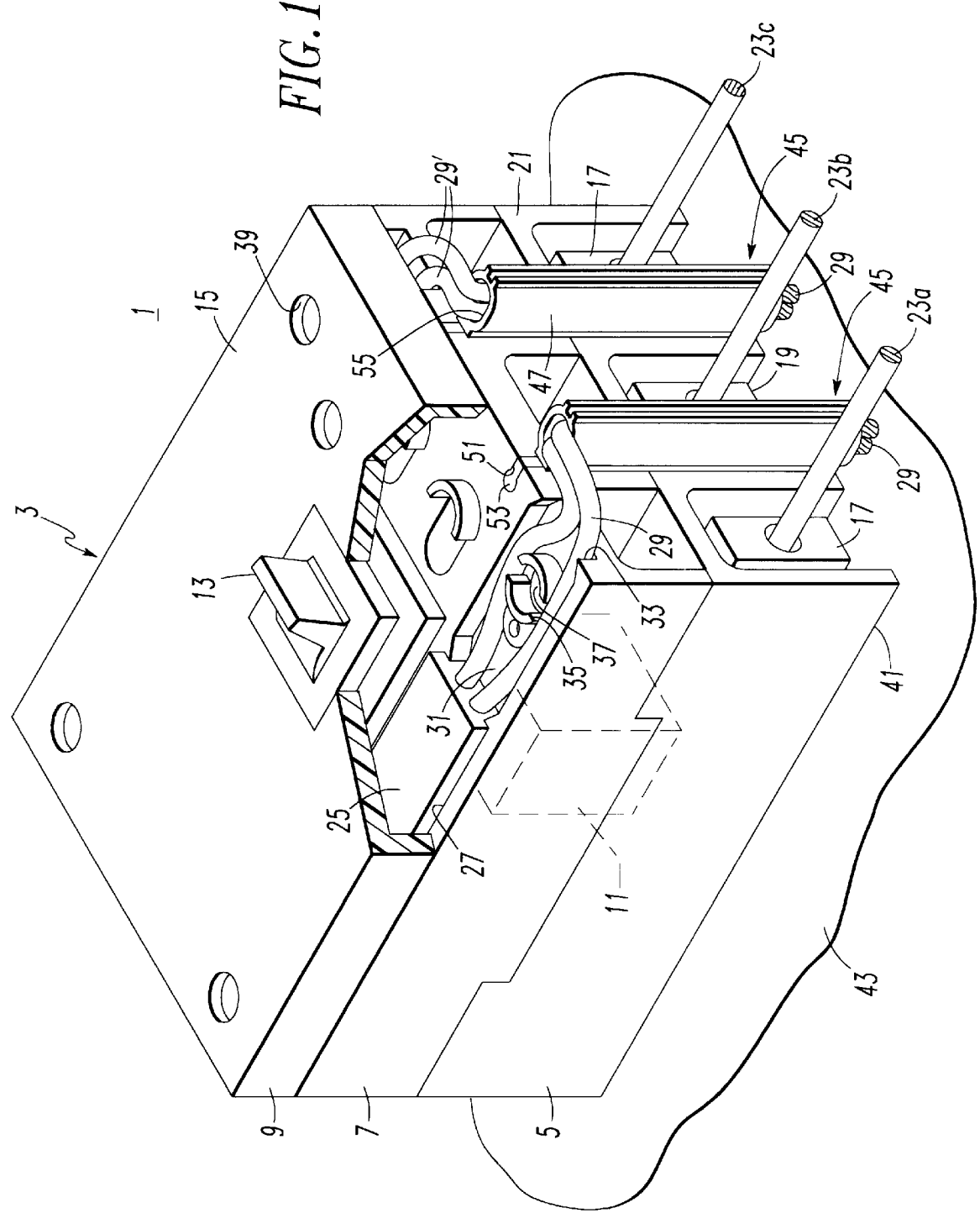
FIG. 1 is an isometric view with part cut away of a switching device incorporating the invention.
Figure 2:
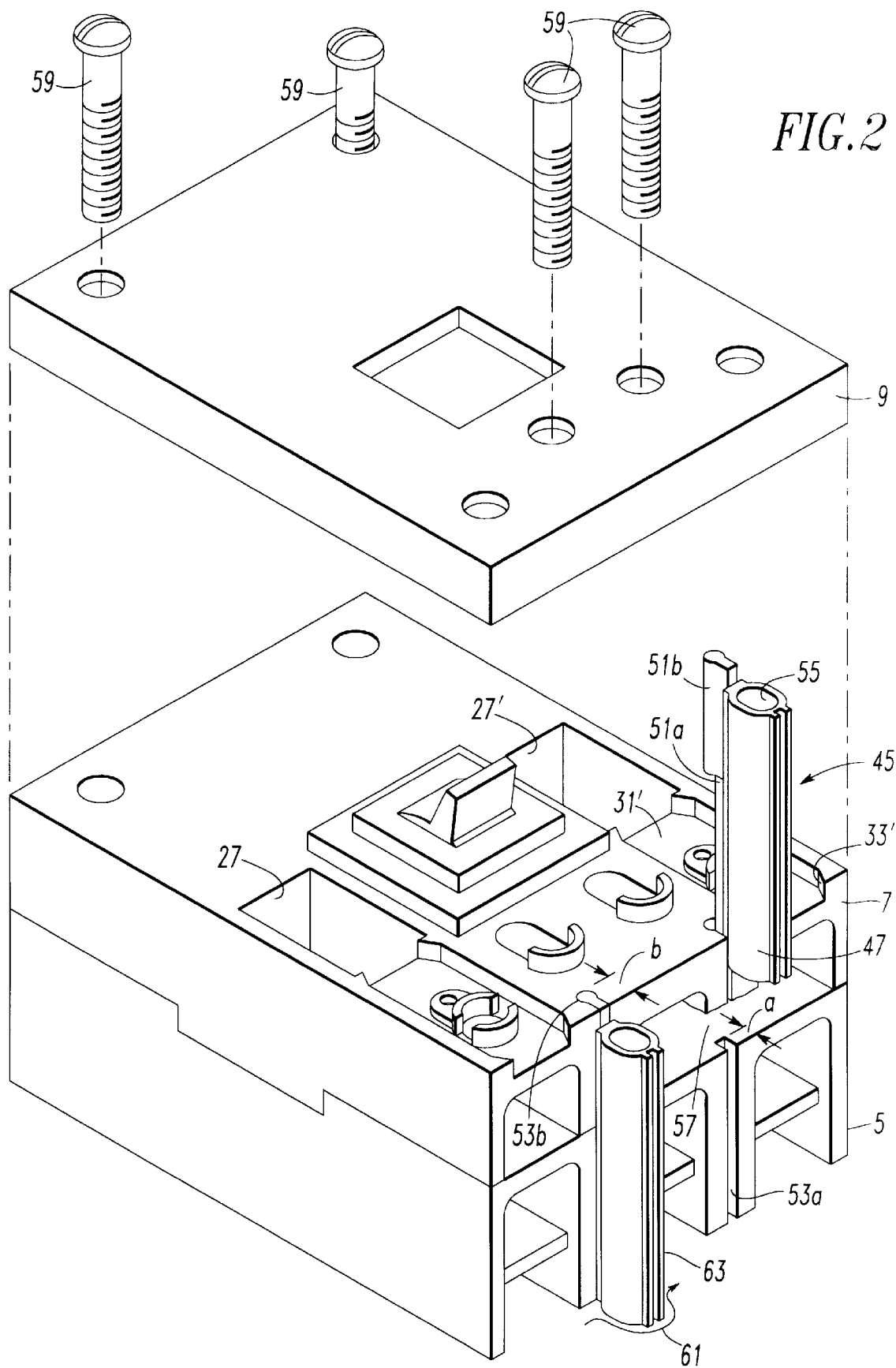
FIG. 2 is an isometric partially exploded view of the switching device of FIG. 1.

Referring to FIGS. 1 and 2, switching apparatus such as circuit breaker, contactor, motor starter, overload relay and the like 1 has a molded casing 3 which includes a base 5, a primary cover 7 and a secondary cover 9. The molded case or housing encloses a switching device 11 which can be manually operated by a switch handle 13 which projects from a front face 15 of the housing 3. The switching device 11 shown is a three phase device which is connected to three adjacent power terminals 17 located in spaced apart terminal recesses 19 in an end face 21 of the housing. These power terminals 17 are connected to the phase conductors 23a–23c of a power circuit. Similar power terminals are provided in terminal recesses (both not shown) in the opposite end of the housing for connection to additional phase conductors (not shown).

The switch 1 incorporates at least one attachment device 25 which is received in a recess 27 in the top of the primary cover 7 and interconnects with the switching device 11 in a known manner. This attachment device can be an output device which provides an electrical signal indicating the trip status if the switch is a circuit breaker, the opened or closed condition of the switch, or an overload condition which could lead to a tripping of the switch. Alternatively, the attachment device can be an input device such as a shunt trip device which can respond to an external electrical signal to remotely trip the switch open or an undervoltage release device which opens the switch in response to low voltage in the protected circuit.

The attachment device 25 has electrical leads 29 which are routed through a channel 31 in the primary cover 7 to an exit point 33 in the end face 21 of the housing 3 above a terminal recess 19. Molded guides 35 in the channel 31 direct the electrical leads 29 around an opening 37 in the primary cover 7 which is aligned with another opening 39 in the secondary cover 9 for insertion of a screw driver (not shown) for engaging the power terminal 17.

Typically, the switch 1 is mounted with a rear face 41 of the molded housing 3 against a support panel or other supporting member 43. It is common for the electrical leads 29 of the attachment device 25 to be routed along or through the support panel 43. As can be seen from FIG. 1, the exit point 33 of the housing 3 for the electrical leads 29 is above one of the power terminals 17. In order to provide electrical isolation and physical separation for the electrical leads 29 from the power terminals 17 and the phase conductors 23, insulating guide members 45 are provided in accordance with the invention. These insulating guide members each include an elongated body 47. Along one side edge of the elongated body 47 is a tongue 51 which is engaged by a groove 53 in the housing 3 to secure the elongated body to the housing 3. When secured in place, the elongated body 47 extends essentially from about the level of the exit point 33 of the electrical leads 29 from the housing to a point adjacent to the rear face 41 of the housing. The elongated body has a longitudinally extending passage 55 through which the electrical leads 29 are routed from the exit point 33 to near the rear face 41.

As best seen in FIG. 2, in order to fix the position of each of the insulating guide members 45 longitudinally, the portion 53a of the groove 53 in the base 5 has a first cross section, while the section of the groove 53b in the primary cover 7 has a second cross section including a lateral dimension such as the dimension b which is greater than the corresponding dimension, dimension a of the section 53a to thereby form a shoulder 57. Similarly, a first, lower portion 51a of the tongue has a cross section complimentary to the cross section of the groove 53a in the base, while the upper, second portion 51b of the tongue has a cross section complimentary to that of the cross section of the section of the groove 53b. Thus, when the tongue 51 on the insulating guide member 45 is inserted in the associated groove 53, the upper section 51b of the tongue seats on the shoulder 57 to fix the position of the insulating guide member relative to the terminal recesses and the exit point 33. The insulative guide member 45 is retained in position by the secondary cover 9 which extends over the top end of the tongue. The secondary cover 9 is retained in place by screws 59 which engage the primary cover 7.

The primary cover 7 can be provided with a second attachment recess 27' in which a second attachment device (not shown) can be secured with the leads 29' extending through a channel 31' and exiting the molded housing at the exit point 33'. An associated insulating guide member 45 has an elongated body 47 which is secured to the end face 21 of the molded housing 3 by a tongue 51 engaging a groove 53 in the base. The electrical leads 29' for the second attachment device are routed through the passage 55 in the associated insulative guide member 45.

The insulative guide members 45 not only provide electrical isolation between the electrical leads 29 for the attachment devices 25, but also increase the oversurface distance 61 between adjacent power terminals 17 and thereby reduce the chances of flash over between terminals. This oversurface distance 61 between power terminals 17 can be increased by one or more ribs 63 extending longitudinally along the elongated body 47, and preferably extending laterally outward opposite to the tongue 51.

Figure 3:
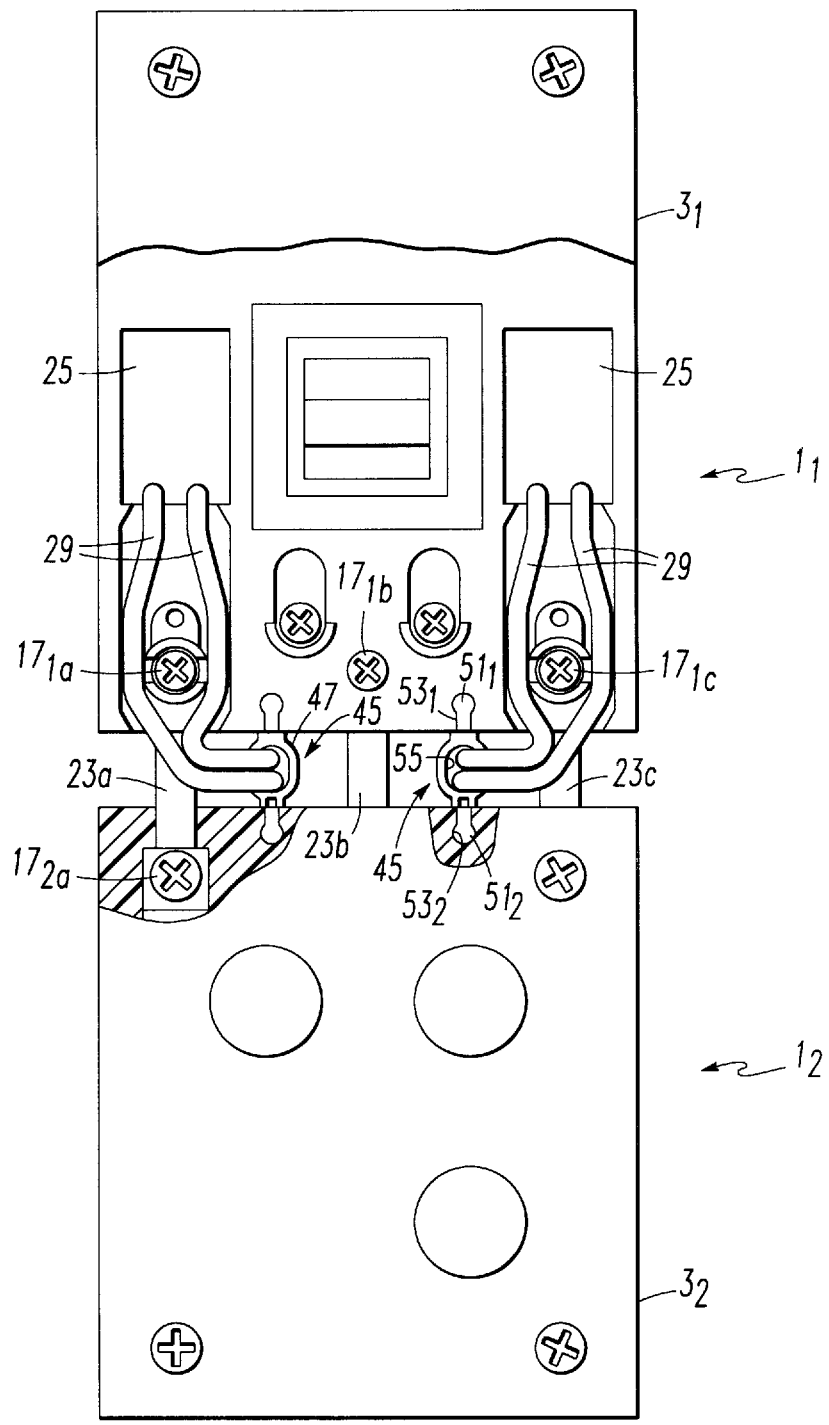
FIG. 3 is an plan view of the combination of the switching device of FIG. 1 shown with the secondary cover removed, and a second switching device.

As another aspect of the invention, as shown in FIG. 3, the insulative guide members 45 can be used to isolate the phase conductors $23_a$, $23_b$ and $23_c$ extending between terminals $17_{1a}$–$17_{1c}$ and terminals such as $17_{2a}$ of confronting switch units $1_1$, and $1_2$ having housings $3_1$, and $3_2$ respectively. In this instance, the elongated bodies 47 can have longitudinally extending tongues $51_1$ and $51_2$ extending along opposite edges for engagement with the grooves $53_1$ and $53_2$ in the switches $1_1$ and $1_2$. In such an arrangement, the switch $1_1$ could be a contactor and the switch $1_2$ an overload relay. In other applications, the switch $1_1$ could be a circuit breaker and the switch $1_2$ a contactor. In this application, the leads 29 of one or more attachment devices 25 could be routed through the passages 55 in the elongated bodies 47 of the insulative guide members.

In both embodiments shown, the tongue-and-groove connections could be reversed so that the tongue was on the switch and the groove was in the elongated insulative bodies, however, the arrangement shown is preferred.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Switching apparatus for an electric power circuit comprising:

a switch housing;

a switching device mounted in said switch housing;

power terminals for connecting said switching device to said electrical circuit mounted in spaced relation at an end face of said switch housing;

an attachment device connected in said housing to said switching device and having electrical leads exiting said switch housing adjacent said power terminals; and at least one insulative guide member having an elongated body with a longitudinally extending passage through which said electrical leads are routed, and means securing said elongated body to said end face adjacent said power terminals.

2. The switching apparatus of claim 1 wherein said housing has terminal recesses in said end face in which said power terminals are mounted, said terminal recesses extend generally from a front face to a rear face of said housing, said electrical leads exit said switch housing at an exit point spaced from said rear face and said elongated body of said insulative guide member extends along said end face adjacent said terminal recesses substantially from said exit point to said rear face.

3. The switching apparatus of claim 2 wherein said elongated body of said insulative guide member extends transversely between adjacent terminal recesses.

4. The switching apparatus of claim 3 wherein said elongated body of said insulative guide member extends laterally outward from said end face of said switch housing to provide an oversurface distance between said adjacent terminal recesses greater than spacing between said terminal recesses over said end face.

5. The switching apparatus of claim 4 wherein said means securing said elongated body to said end face comprises a tongue on one of said elongated body and said end face, and a groove on the other of said elongated body and said end face which is engaged by said tongue.

6. The switching apparatus of claim 5 wherein said tongue is on said elongated body and said groove is in said end face.

7. The switching apparatus of claim 1 wherein said means securing said elongated body to said end face comprises a tongue on one of said elongated body and said end face and a groove in the other of said elongated body and said end face which is engaged by said tongue.

8. The switching apparatus of claim 7 wherein said securing means includes means locking said tongue from longitudinal movement in said groove.

9. The switching apparatus of claim 1 wherein said switch housing comprises a base, a primary cover mating with said base and a secondary cover on said primary cover, and wherein said securing means comprises a tongue extending longitudinally on said elongated body and aligned grooves in said primary cover and said base which are engaged by said tongue, said groove in said base having a first cross section, said groove in said primary cover having a second cross section including a dimension greater than a corresponding dimension of said first cross section to form a shoulder, said tongue having a first portion with a cross section complementary to said first cross section, and a second portion with a cross section complementary to said second cross section, such that with said first portion of said tongue engaging said groove in said base and said second portion of said tongue engaging said groove in said primary cover, said second portion of said tongue is captured longitudinally between said shoulder and said secondary cover.

10. The switching apparatus of claim 9 wherein said grooves in said base and primary cover extend between adjacent terminal recesses in said end face.

11. The switching apparatus of claim 9 wherein said elongated body has a lateral dimension outward from said end face providing an oversurface distance between said adjacent terminal recesses greater than a distance between said adjacent terminal recesses over said end face.

12. The switching apparatus of claim 11 wherein said elongated body has at least one longitudinally extending rib projecting laterally outward from said elongated body further increasing said oversurface distance.

13. Switching apparatus for connection in an electric power circuit comprising:

a planar support member;

a first switching unit comprising a first housing mounted on said planar support member and having a first set of power terminals spaced apart on an end face;

a second switching unit comprising a second housing having a second set of power terminals spaced apart on an end face and mounted in spaced relation to said first housing on said planar support member with said second set of power terminals in confronting general alignment with the first set of power terminals;

a set of conductors connecting first said power terminals with said second set of power terminals; and insulative barrier means comprising elongated bodies extending between said conductors and securing means securing side edges of said elongated bodies to said end faces of said first and second housings between said power terminals on said end faces.

14. The switching apparatus of claim 13 wherein said securing means comprises tongues on one of said side edges of said elongated bodies and said end faces, and grooves on the other of said side edges of said elongated bodies and said end faces which are engaged by said tongues.

15. The switching apparatus of claim 14 wherein one of said switching devices has attachment means in said housing with electrical leads exiting said housing adjacent an elongated body of said insulative barrier means and spaced from said planar support member, and wherein said elongated body of said insulated barrier has a passage extending toward said planar support member through which said electrical leads are routed to said planar support member.

16. The switching apparatus of claim 13 wherein one of said switching devices has attachment means in said housing with electrical leads exiting said housing adjacent an elongated body of said insulative barrier means and spaced from said planar support member, and wherein said elongated body of said insulated barrier has a passage extending toward said planar support member through which said electrical leads are routed to said planar support member.

* * * * *